United States Patent [19]

Tanaka

[11] Patent Number: 5,455,128
[45] Date of Patent: Oct. 3, 1995

[54] NONAQUEOUS BATTERY

[75] Inventor: Mitsutoshi Tanaka, Kanagawa, Japan

[73] Assignee: Fuji Photo Film Co., Ltd., Kanagawa, Japan

[21] Appl. No.: 125,653

[22] Filed: Sep. 23, 1993

[30] Foreign Application Priority Data

Sep. 25, 1992 [JP] Japan .................................. 4-256629

[51] Int. Cl.⁶ .................................................. H01M 6/14
[52] U.S. Cl. ............................ 429/218; 429/53; 429/163; 429/147; 429/194
[58] Field of Search ...................................... 429/247, 194, 429/53, 163, 218

[56] References Cited

U.S. PATENT DOCUMENTS 4,939,050  7/1990  Toyosawa et al. ...................... 429/241
5,108,855  4/1992  Daifuku et al. ......................... 429/191

OTHER PUBLICATIONS

Metals Handbook, 9th Ed., vol. 3, p. 191, (1980).

Primary Examiner—Stephen Kalafut
Assistant Examiner—M. Nuzzolillo
Attorney, Agent, or Firm—Sughrue, Mion, Zinn, Macpeak & Seas

[57] ABSTRACT

A secondary battery including a positive electrode, a negative electrode made of an active material of light metal or its alloy or an active material capable of intercalating/deintercalating lithium ion, and a nonaqueous electrolyte, in which at least a portion of the container of the battery is made of an austenite stainless steel containing molybdenum.

8 Claims, 1 Drawing Sheet

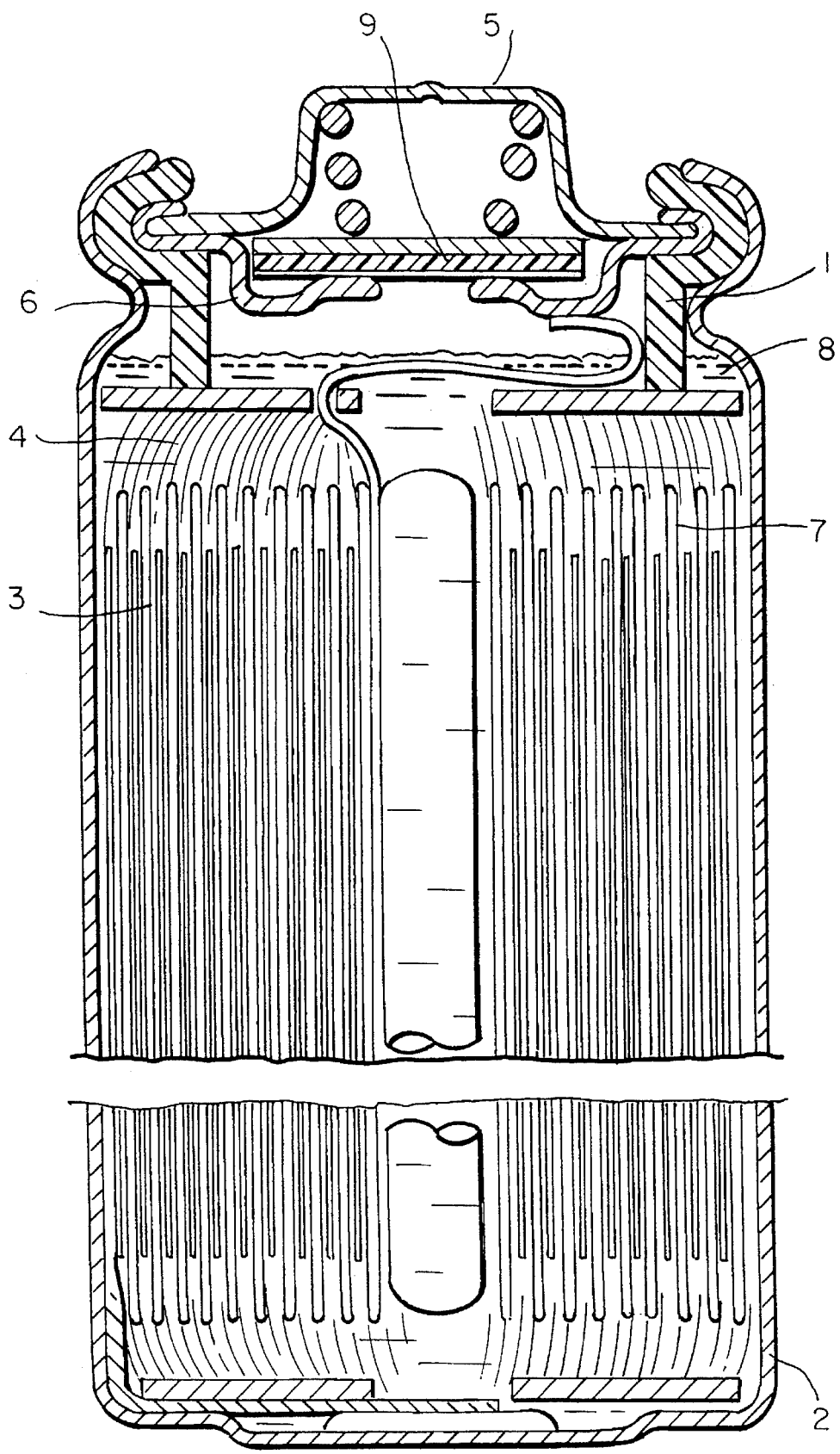

NONAQUEOUS BATTERY

FIELD OF THE INVENTION

The present invention relates to a nonaqueous battery comprising an active material of light metal or its alloy or an active material capable of intercalating/deintercalating lithium ion as a negative electrode.

BACKGROUND OF THE INVENTION

A nonaqueous battery comprises an active material that can easily react with water (e.g., light metal or its alloy or material capable of intercalating/deintercalating lithium ion) as a negative electrode. Therefore, the nonaqueous battery is arranged such that no water is incorporated in the electrolyte, and the battery container is hermetically sealed to prevent water from entering the battery. The battery container consists of metallic members such as a can, cap and sealing plate and a resin gasket. As materials for these metallic members, the following materials have been proposed.

As the material for a cylindrical battery container, which also serves as a negative electrode terminal (can), a nickel-plated iron plate has been proposed (as disclosed in JP-A-1-279578) (the term "JP-A" as used herein means an "unexamined published Japanese patent application"). Aluminum has been proposed as the material for a sealing plate which also serves as a positive electrode terminal (as disclosed in JP-A-1-279578). As the material for a sealing plate for a coin-shaped battery, which also serves as a negative electrode terminal, steel comprising 1 to 3% by weight of molybdenum and 15 to 18% by weight of chromium (corresponding to SUS 444 (JIS G 4305), as disclosed in JP-A-2-174078), iron (as disclosed in JP-B-61-17335) (the term "JP-B" as used herein means an "examined Japanese patent publication"), aluminum (as disclosed in JP-A-58-154163), austenite stainless steel (as disclosed in JP-A-58-157050 and JP-A-61-232555), copper (as disclosed in JP-A-61-245462), binary austenite ferrite stainless steel (as disclosed in JP-A-61-285653), ferrite stainless steel (as disclosed in JP-A-63-124358 and JP-A-2-126554) or the like have been proposed.

A nonaqueous battery comprising an active material of light metal or its alloy or an active material capable of intercalating/deintercalating lithium ion as a negative electrode exhibits a higher battery voltage than conventional aqueous batteries. For example, in an aqueous system, an alkali battery, a nickel-cadmium battery and a lead storage battery exhibit a battery voltage of 1.5 volt, 1.2 volt and 1.2 volt, respectively. On the other hand, in the nonaqueous system, a lithium carbon fluoride battery, a lithium cobalt oxide positive electrode-carbon negative electrode lithium ion battery, a polyaniline derivative positive electrode battery, a LiCoO$_2$ positive electrode/lithium-containing transition metal oxide (e.g., Li$_p$Co$_q$V$_{1-q}$O$_r$ in which p=0.7 to 3, q=0 to 1, and r=1.2 to 5.5) negative electrode battery exhibit a battery voltage of 3 volt, 3.6 volt, 3.8 volt and 3 volt, respectively.

If aluminum, nickel-plated iron plate, SUS 304 or SUS 430 (JIS G 4305) is used as a container material for a nonaqueous battery to prepare a sealing plate, some problems occur. In particular, a battery comprising a sealing plate made of aluminum is disadvantageous in that the sealing plate lacks mechanical strength (rigidity) and the sealing plate exhibits gradual deformation by an elastic material which is used as a safety valve, if the elastic material is embedded in the sealing plate. Further, the sealing plate can be easily deformed by a rise in internal pressure. Moreover, the sealing plate can be easily deformed upon impact if the battery should fall. A battery comprising a sealing plate made of a nickel-plated iron plate suffers from remarkable corrosion of the sealing plate during storage. A battery comprising a sealing plate made of SUS 304 or SUS 430 shows many corrosion holes in the sealing plate during storage.

A cylindrical battery container (can), which also serves as a negative electrode terminal, is less subject to corrosion than the foregoing sealing plate. In general, the cylindrical battery container is electrically connected to the negative electrode and is therefore considered to lower the corrosion potential. This is the reason why the cylindrical battery is insusceptible to corrosion. However, if the battery is overdischarged, the cylindrical battery container may corrode. If a battery comprising a cylindrical battery container made of a nickel-plated iron plate is overdischarged, remarkable corrosion occurs. Further, if a battery comprising a cylindrical battery container (can) made of SUS 304 is overdischarged, many corrosion holes occur on the inner wall of the battery container.

If such corrosion in these members is allowed to continue, the metal corroded away from the material of these membranes is deposited on the surface of the active material, which deteriorates battery performance. Further, if the corrosion continues, the container develops holes and fails to maintain its hermetic sealing structure which causes liquid leakage or battery deterioration.

As a solution to these problems, a battery comprising a negative electrode sealing plate made of a steel comprising 1 to 3% by weight of molybdenum and 15 to 18% by weight of chromium (corresponding to SUS 444) as disclosed in JP-A-2-174078 has been proposed. This steel is resistant to such corrosion. However, this steel leaves much to be desired in workability.

SUMMARY OF THE INVENTION

It is therefore an object of the present invention to provide a nonaqueous battery which exhibits high corrosion resistance, high rigidity and excellent workability.

The above and other objects and advantages of the present invention will become more apparent from the following detailed description and examples.

The foregoing object of the present invention is accomplished with a secondary battery comprising a positive electrode, a negative electrode made of an active material of light metal or light metal alloy or an active material capable of intercalating/deintercalating lithium ion, and a nonaqueous electrolyte, wherein at least a portion of the container of the battery is made of an austenite stainless steel containing molybdenum.

BRIEF DESCRIPTION OF THE DRAWING

By way of example and to make the description clearer, reference is made to the accompanying drawing.

The FIGURE illustrates an embodiment of the cylindrical battery according to the present invention, in which reference numeral 1 indicates an insulating gasket made of a synthetic resin (polypropylene), reference numeral 2 indicates a negative electrode can serving also as a negative electrode terminal, reference numeral 3 indicates a negative electrode, reference numeral 4 indicates a separator, reference numeral 5 indicates a cap serving also as a positive electrode terminal, reference numeral 6 indicates a sealing plate serving also as a positive electrode terminal, reference numeral 7 indicates a positive electrode, reference numeral 8 indicates an electrolyte, and reference numeral 9 indicates a safety valve.

DETAILED DESCRIPTION OF THE INVENTION

Stainless steel is an Fe—Cr steel containing about 11 % or more of chromium which is resistant to rusting. This alloy forms a thin passive film on its surface in the atmosphere and then shows little subsequent corrosion. Therefore, articles made of this alloy need not be coated or plated. Stainless steels are classified as martensite, ferrite, austenite, ferritic austenite or semi-austenite steel. Austenite stainless steel is Fe—Cr—Ni or Fe—Cr—Mn steel having an austenite structure that provides high strength and excellent ductility over a wide temperature range from low temperature to an elevated temperature. When quenched from a temperature of about 1,000° C. or higher, such a stainless steel forms a solid solution that provides a nonmagnetic perfect austenite structure having excellent corrosion resistance and maximum ductility.

The material of the battery container to be used in the present invention is an austenite stainless steel (according to JIS G 4305) containing molybdenum. The molybdenum content is preferably 1 to 7% by weight, more preferably 1.2 to 6% by weight, most preferably 1.7 to 4% by weight. The nickel content is preferably 8 to 18% by weight, more preferably 9 to 16% by weight, most preferably 10 to 15% by weight. The chromium content is preferably 11 to 26% by weight, more preferably 15 to 20% by weight, most preferably 16 to 19% by weight. The nickel, chromium and molybdenum contents in combination are preferably 8 to 18% by weight, 11 to 26% by weight and 1 to 7% by weight, more preferably 9 to 16% by weight, 15 to 20% by weight and 1.2 to 6% by weight, most preferably 10 to 15% by weight, 16 to 19% by weight and 1.7 to 4% by weight, respectively. The manganese content is 0 to 2.0% by weight.

As an austenite stainless steel to be used in the present invention, SUS 316L or SUS 316 (JIS G 4305) is preferred.

The battery container as defined herein serves to house electricity-generating elements such as the positive electrode, negative electrode and nonaqueous electrolyte in an airtight construction while providing a positive electrode terminal and a negative electrode terminal that are insulated from each other. In the cylindrical or rectangular battery, the container consists of a cylindrical or rectangular battery can which also serves as a terminal, a sealing plate or cap which is adapted to close the opening end of the battery can and also to serve as another terminal, and a gasket which is adapted to insulate the sealing plate or cap from the battery can. In the coin-shaped or button-shaped battery, the container consists of a positive electrode can which also serves as a positive electrode terminal, a negative electrode can which also serves as a negative electrode terminal, and a gasket which is adapted to insulate the positive electrode can from the negative electrode can. In the film type battery, the container consists of a positive electrode outer plate which also serves as a positive electrode terminal, a negative electrode outer plate which also serves as a negative electrode terminal, and an insulating member which is adapted to connect the two outer plates.

Among these members, the austenite stainless steel containing molybdenum of the present invention should be preferably incorporated in a portion which is electrically connected to the positive electrode and comes into contact with the electrolyte, more preferably a portion which is electrically connected to the positive electrode and comes into contact with the electrolyte or is likely to come into contact with the electrolyte, most preferably a portion which is electrically connected to the positive electrode and comes into contact with the electrolyte or is likely to come into contact with the electrolyte and a portion which is electrically connected to the negative electrode and comes into contact with the electrolyte or is likely to come into contact with the electrolyte.

Specifically, in the cylindrical or rectangular battery, the austenite stainless steel containing molybdenum of the present invention should be preferably incorporated in the sealing plate, more preferably the sealing plate and cap, most preferably the cylindrical or rectangular battery can and the sealing plate and/or cap adapted to close the opening end thereof. In the inside-out type cylindrical or rectangular battery, the austenite stainless steel containing molybdenum of the present invention should be preferably incorporated in the cylindrical or rectangular battery can, more preferably the sealing plate and the cylindrical or rectangular battery can, most preferably the cylindrical or rectangular battery can and the sealing plate and/or cap adapted to close the opening end thereof. In the coin-shaped or button-shaped battery, the austenite stainless steel containing molybdenum of the present invention should be preferably incorporated in the side which also serves as a positive electrode terminal, more preferably both the side which also serves as a positive electrode terminal and the side which also serves as a negative electrode terminal. In the film type battery, the austenite stainless steel containing molybdenum of the present invention should be preferably incorporated in the positive electrode outer plate, more preferably both the positive electrode outer plate and the negative electrode outer plate.

Any electrode material for nonaqueous battery which contains lithium may be used as the active material to be used in the present invention. Examples of inorganic positive electrode active materials for a lithium battery include Co oxides (as described in JP-A-52-12424, DE- 2,606,915), Li—Co oxides (as described in U.S. Pat. Nos. 3,945,848, 4,340,652), Li—Ni—Co oxides (as described in EP-A2-43926, JP-A-63-114063, JP-A-63-211565, JP-A-63-299056, JP-A-1-120765), V oxides (as described in FR 21,611,796, JP-A-55-53077, JP-A-62-140362, JP-A-62-227358), Li—V oxides ("Denki Kagaku" (Electrochemistry), vol. 48, 432 (1980), "Journal of Electrochemical Society", vol. 130, 1225 (1983), JP-A-2-12769), Mn oxides (as described in EP-A-269855, JP-A-6358761), Li—Mn oxides (as described in JP-A-56-136464, JP-A-56-114064, JP-A-56-114065, JP-A-56-148550, JP-A-56-221559, JP-A-1-5459, JP-A-1-109662, JP-A-1-128371, JP-A-1-209663, JP-A-2-27660), and Li—Ni—Mn oxides (as described in JP-A-63-210028).

Examples of organic high molecular positive electrode active materials include polyaniline derivatives (as described in "Molecular Crystal and Liquid Crystal", vol. 121, 173 (1985), JP-A-60-197728, JP-A-63-46223, JP-A-63243131, JP-A-2-219823), pyrrole derivatives (as described in "Journal of Chemical Society", Chemical Communication, 854, (1979), DE 3,223,544A, JP-A-62-225517, JP-A-63-69824, JP-A-1-170615), polythiophene derivatives (as described in JP-A-58-187432, JP-A-1-12775), polyacene derivatives (as described in JP-A-58-209864), and polyparaphenylene derivatives. These derivatives include copolymers.

Examples of these organic high molecular compounds are disclosed in Naoya Ogata, "Dodensei Kobunshi" (Electrically Conductive High Molecular Compounds), Kodansha Scientific, 1990.

Examples of the light metal or its alloy to be used as a negative electrode material in the present invention include lithium metals, and lithium alloys (e.g., Al, Al—Mn (U.S. Pat. No. 4,820,599), Al—Mg (JP-A-57-98,977), Al—Sn (JP-A-63-6,742), Al—In, Al—Cd (JP-A-1-144,573)).

Examples of the active material capable of intercalating/deintercalating lithium ion as used herein include calcined carbon compounds (as described in JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, JP-A-1-274360), and lithium-containing transition metal oxides (Japanese Patent Application No. Hei 4-106642).

Preferred among these lithium-containing transition metal oxides is $Li_eM_fO_g$ (in which M represents at least one metal selected from the group consisting of Ti, V, Cr, Mn, Fe, Co, Ni, Nb, Mo and W, e is from 0.7 to 3, f represents an integer 1 or 2, and g is from 1 to 5.5). More preferred among these lithium-containing transition metal oxides is $Li_eM_fO_g$ (in which M represents at least one metal selected from the group consisting of V, Mn, Fe, Co and Ni, e is from 0.7 to 3, f represents an integer 1 or 2, and g is from 1 to 5.5). Most preferred among these lithium-containing transition metal oxides is $Li_pCO_qV_{1-q}O_r$ (in which p is from 0.7 to 3, q is from 0 to 1, and g is from 1.2 to 5.5).

The electrode additive may normally comprise an electrically conductive material such as carbon, silver (as described in JP-A-63-148554) or a polyphenylene derivative (as described in JP-A-59-20971) incorporated therein.

The nonaqueous electrolyte typically consists of at least one aprotic organic solvent such as propionic carbonate, ethylene carbonate, γ-butyrolactone, 1,2-dimethoxyethane, tetrahydrofuran, 2-methyltetrahydrofuran, dimethylsulfoxide, 1,3-dixolan, formamide, dimethylformamide, dioxolan, acetonitrile, nitromethane, triester phosphate (as described in JP-A-60-23973), trimethoxymethane (as described in JP-A-61-4170), dioxolan derivatives (as described in JP-A-62-15771, JP-A-62-22372, and JP-A-62-108474), sulfolane (as described in JP-A-62-31959), 3-methyl-2-oxazolidinone (as described in JP-A-62-44961), propionic carbonate derivative (as described in JP-A-62-290069, and JP-A-62-290071), tetrahydrofuran derivative (as described in JP-A-63-32872) and ethyl ether (as described in JP-A-63-62166), 1,3-propanesultone (as described in JP-A-63-102173) and a lithium salt soluble in such a solvent, such as $LiClO_4$, $LiBF_4$, $LiPF_6$, $LiCF_3SO_3$, $LiCF_3CO_2$, $LiAsF_6$, $LiSbF_6$, $LiB_{10}Cl_{10}$ (as described in JP-A-57-74974), $Li(1,2\text{-dimethoxyethane})_2ClO_4$ (as described in JP-A-57-74974), lower aliphatic carboxylate of lithium (as described in JP-A-60-41773), $LiAlCl_4$, LiCl, LiBr, LiI (as described in JP-A-60-247265), lithium chloroborane compound (as described in JP-A-61-165957) and lithium tetraphenylborate (as described in JP-A-61-214376). Typical among these combinations is an electrolyte comprising $LiClO_4$ or $LiBF_4$ or $LiPF_6$ incorporated in a mixture of propionic carbonate and 1,2-dimethoxyethane.

Alternatively, the nonaqueous battery of the present invention may comprise a solid electrolyte as mentioned below. (The term "nonaqueous electrolyte" as used herein also means a solid electrolyte as mentioned below.) Solid electrolytes are classified as inorganic solid electrolytes or organic solid electrolytes.

As such inorganic solid electrolytes, Li nitrides, halides and oxyacids are well known. Useful among these compounds are $Li_3N$, LiI, $Li_5NI_2$, $Li_3N$—LiI—LiOH, $LiSiO_4$, $LiSiO_4$—LiI—LiOH (as described in JP-A-49-81899), $xLi_3PO_4\text{-}(1-x)Li_4SiO_4$ (as described in JP-A-59-60866), $Li_2SiS_3$ (as described in JP-A-60-501731), and phosphorus sulfide (as described in JP-A-62-82665).

Useful examples of organic solid electrolytes include polyethylene oxide derivatives or polymers containing such polyethylene oxide derivatives (as described in JP-A-63-135447), polypropylene oxide derivatives or polymers containing such polypropylene oxide derivatives, polymers containing ion dissociation groups (as described in JP-A-62-254302, JP-A-62-254303, and JP-A-63-193954), mixtures of polymers containing ion dissociation groups and the aforementioned aprotic electrolytes (as described in U.S. Pat. Nos. 4,792,504, and 4,830,939, and JP-A-62-22375, JP-A-62-22376, JP-A-63-22375, JP-A-63-22776, and JP-A-1-95117), and phosphoric ester polymers (as described in JP-A-61-256573). Further, a polyacrylonitrile may be incorporated in an electrolyte (as described in JP-A-62-278774). Moreover, an inorganic solid electrolyte and an organic solid electrolyte may be used in combination (as described in JP-A-60-1768).

A separator is an insulating thin membrane having a high ion permeability and a predetermined mechanical strength. From the standpoint of resistance to organic solvents and hydrophobicity, a nonwoven cloth of olefin such as polypropylene, glass fiber, etc. may be used.

Carriers for electrode active materials include, for a positive electrode, stainless steel and aluminum as well as porous foamed metal (as described in JP-A-59-18578), titanium (as described in JP-A-59-68169), expanded metal (as described in JP-A-61-264686) and punched metal or, for a negative electrode, stainless steel, nickel, titanium, aluminum and copper as well as porous nickel (as described in JP-A-58-18883), porous aluminum (as described in JP-A-58-38466), sintered aluminum (as described in JP-A-59-130074), a formed body of aluminum fiber group (as described in JP-A-59-148277), surface-silvered stainless steel (as described in JP-A-60-41761), a calcined carbon material such as calcined phenol resin (as described in JP-A-60-112264), Al—Cd alloy (as described in JP-A-60-211779), porous foamed metal (as described in JP-A-61-74268), etc. Preferred among these carrier materials are austenite stainless steel, aluminum, titanium, and copper.

Suitable collectors or lead plates include any electron conductor which does not undergo chemical change in the battery. Examples of electron conductors include stainless steel, nickel, titanium, aluminum, copper, nickel-plated copper (as disclosed in JP-A-48-36627), titanium-plated copper, copper-treated stainless steel (as described in JP-A-60-175373) or the like. Preferred among these collector materials or lead plates are austenite stainless steel, nickel, aluminum, titanium and copper, which are substantially nonmagnetic.

There are several methods for sealing the battery. One of these methods, for the cylindrical or rectangular battery, is to dispose an insulating gasket between a cylindrical or rectangular battery can which also serves as one terminal and a sealing plate or cap which is adapted to close the opening end of the battery can and which also serves as the other terminal. In this method, a battery can, an insulating gasket, and a sealing plate or cap are normally superimposed on each other. A pressure is applied to the opening of the battery can so that it is plastically deformed in such a direction that the insulating gasket is depressed (referred to as "crimp sealing" or "caulking") to seal the battery.

Another sealing method is to weld the periphery of the cap to the metal can. Welding may be accomplished by electric welding, laser welding or the like.

A further sealing method is to dispose an insulating member between a container member which also serves as a positive electrode terminal and a container member which also serves as a negative electrode terminal and then bond the insulating member to the containers to seal the battery. Bonding is accomplished with an adhesive, or by heat sealing, ultrasonic sealing, or the like.

The shape of the battery of the present invention may be coin, button, cylinder, square, film or the like.

The charging cut off voltage of the battery according to the present invention is from 3 to 5 volts.

Preferred embodiments of the present invention are described below:

(1) A secondary battery comprising a positive electrode, a negative electrode made of an active material of light metal or its alloy or an active material capable of intercalating/deintercalating lithium ion, and a non-aqueous electrolyte, wherein at least a portion of the container of said battery is made of an austenite stainless steel containing molybdenum.

(2) The secondary battery as defined in Paragraph (1), comprising a positive electrode, a negative electrode made of an active material of lithium or its alloy or an active material capable of intercalating/deintercalating lithium ion, and a nonaqueous electrolyte.

(3) The secondary battery as defined in Paragraph (1), comprising a positive electrode, a negative electrode made of an active material capable of intercalating/deintercalating lithium ion, and a nonaqueous electrolyte.

(4) The secondary battery as defined in Paragraph (1), comprising a positive electrode, a negative electrode made of an active material of lithium-containing oxide, and a nonaqueous electrolyte.

(5) The secondary battery as defined in Paragraph (1), comprising a positive electrode, a negative electrode made of an active material of lithium-containing transition metal oxide, and a nonaqueous electrolyte.

(6) The secondary battery as defined in any one of Paragraphs (1), (2), (3), (4) and (5), wherein the austenite stainless steel has a molybdenum content of 1.7 to 4% by weight.

(7) The secondary battery as defined in any one of Paragraphs (1), (2), (3), (4) and (5), wherein the austenite stainless steel has a molybdenum content of 1.7 to 4% by weight, a nickel content of 10 to 15% by weight and a chromium content of 16 to 19% by weight.

(8) The secondary battery as defined in Paragraph (6) or (7), wherein the at least a portion of the battery container is a container member which also serves as a positive electrode terminal.

(9) The secondary battery as defined in Paragraph (6) or (7), wherein the at least a portion of the battery container is a container member which also serves as a positive electrode terminal as well as a container member which also serves as a negative electrode terminal.

(10) The secondary battery as defined in Paragraph (1), wherein the charging cut off voltage is from 3 to 5 volts.

The present invention will be further described in the following examples, but the present invention should not be construed as being limited thereto. Amounts are by weight unless otherwise indicated.

(1) Preparation of batteries of examples and comparative examples

EXAMPLE 1

A positive electrode comprising $LiCoO_2$ (obtained by calcining lithium carbonate and cobalt carbonate in the air at a temperature of 900° C. for 6 hours) was used as a positive electrode active material. A negative electrode comprising $Li_{1.0}CO_{0.25}V_{0.75}O_{25}$ (obtained by calcining lithium carbonate, cobalt carbonate and ammonium metavanadate in the air at a temperature of 900° C. for 6 hours) was used as a negative electrode active material. 1 mol/l of $LiBF_4$ (mixture of propylene carbonate and 1,2-dimethoxyethane in the same volume) was used as an electrolyte. A porous polypropylene membrane was used as a separator. These were used as electricity-generating elements. A sealing plate (thickness: 0.3 mm) was made of an austenite stainless steel containing molybdenum (percentage composition: nickel 11.67% by weight, chromium 17.97% by weight, molybdenum 2.31% by weight, iron 64.25% by weight) and also served as a positive electrode terminal. A cap (thickness: 0.3 mm) was made of an austenite stainless steel containing molybdenum (percentage composition: nickel 11.67% by weight, chromium 17.97% by weight, molybdenum 2.31% by weight, iron 64.25% by weight) and also served as a positive electrode terminal. A battery can (thickness: 0.3 mm) was made of an austenite stainless steel containing molybdenum (percentage composition: nickel 11.67% by weight, chromium 17.97% by weight, molybdenum 2.31% by weight, iron 64.25% by weight) which also served as a negative electrode terminal. An insulating gasket was made of a synthetic resin (polypropylene). Using these members, a cylindrical lithium battery as shown in the figure was prepared.

EXAMPLE 2

A battery was prepared in the same manner as in Example 1 except that the material of the cap also serving as a positive electrode terminal was a nickel-plated iron plate.

EXAMPLE 3

A battery was prepared in the same manner as in Example 1 except that the material of the negative can also serving as a negative electrode terminal was an austenite stainless steel (percentage composition: nickel 8.38% by weight, chromium 18.60% by weight, iron 68.80% by weight).

EXAMPLE 4

A battery was prepared in the same manner as in Example 1 except that the material of the negative can also serving as a negative electrode terminal was an austenite stainless steel (percentage composition: nickel 8.38% by weight, chromium 18.60% by weight, iron 68.80% by weight) and the material of the cap also serving as a positive electrode terminal was a nickel-plated iron plate.

COMPARATIVE EXAMPLE 1

A battery was prepared in the same manner as in Example 1 except that the material of the sealing plate and cap also serving as a positive electrode terminal and the negative can also serving as a negative electrode terminal was a ferrite stainless steel (percentage composition: chromium 17.5% by weight, molybdenum 2.2% by weight, iron 79.1% by weight).

COMPARATIVE EXAMPLE 2

A battery was prepared in the same manner as in Example 1 except that the material of the sealing plate and cap also serving as a positive electrode terminal and the negative can also serving as a negative electrode terminal was aluminum (percentage composition: aluminum 99.3% by weight, iron 0.6% by weight).

COMPARATIVE EXAMPLE 3

A battery was prepared in the same manner as in Example 1 except that the material of the sealing plate and cap also serving as a positive electrode terminal and the negative can also serving as a negative electrode terminal was an austenite stainless steel free of molybdenum (percentage composition: nickel 8.96% by weight, chromium 18.25% by weight, iron 69.58% by weight).

COMPARATIVE EXAMPLE 4

A battery was prepared in the same manner as in Example 1 except that the material of the sealing plate and cap also serving as a positive electrode terminal and the negative can also serving as a negative electrode terminal was a nickel-plated iron plate.

(2) Test for batteries of examples and comparative examples

These batteries were examined as follows:

(a) Charge/Discharge Test:

The foregoing batteries were charged and discharged between 1.8 vol and 3.6 volt at a current density of 1 mA/cm$^2$ 300 times. After the test, these batteries were disassembled and examined for inner corrosion. The results are set forth in Table 1. The battery of Comparative Example 4 was confirmed to have been corroded on the inner side of the sealing plate to such an extent that it was blackened.

TABLE 1

| Example No. | Conditions Inside Battery |
|---|---|
| Example 1: | No change |
| Example 2: | No change |
| Example 3: | No change |
| Example 4: | No change |
| Comparative Example 1: | No change |
| Comparative Examule 2: | No change |
| Comparative Example 3: | No change |
| Comparative Example 4: | Partially corroded on the inner side of the sealing plate, thickness reduced by 30% |

(b) Overcharge Test:

The foregoing batteries were overcharged at room temperature for 1 month from a 4.2-volt power supply with its positive terminal connected to the positive electrode terminal thereof and its negative terminal to the negative electrode terminal thereof. After the test, these batteries were disassembled and examined for inner corrosion. The results are set forth in Table 2. The batteries of Comparative Examples 3 and 4 were confirmed to have been vigorously corroded on the sealing plate to such an extent that there were holes in the sealing plate through which the electrolyte leaked.

TABLE 2

| Example No. | Conditions Inside Battery |
|---|---|
| Example 1: | No change |
| Example 2: | No change |
| Example 3: | No change |
| Example 4: | No change |
| Comparative Example 1: | No change |
| Comparative Example 2: | No change |
| Comparative Example 3: | Partially corroded on the inner side of the sealing plate, thickness reduced by 30% to 100% |
| Comparative Example 4: | Partially corroded on the inner side of the sealing plate, thickness reduced by 70% to 100% |

(c) Overdischarge Test:

The foregoing batteries were discharged to 0 volt at a current density of 1 mA/cm$^2$. These batteries were overdischarged by a 3.5-volt power supply with its positive terminal connected to the negative electrode terminal thereof and its negative terminal connected to the positive electrode terminal thereof at room temperature for 1 month. After the test, these batteries were disassembled and examined for inner corrosion. The results are set forth in Table 3. The battery of Comparative Example 4 was confirmed to have been vigorously corroded on the inner side of the negative electrode can also serving as a negative electrode terminal to such an extent that it had holes through which the electrolyte leaked. The batteries of Examples 3 and 4 and Comparative Example 3 were observed to have minute recesses that could be perceived under a microscope on the inner side of the negative electrode can also serving as a negative electrode terminal (the extent of these recesses is considered to be negligible depending on the application of the batteries).

TABLE 3

| Example No. | Conditions Inside Battery |
|---|---|
| Example 1: | No change |
| Example 2: | No change |
| Example 3: | Slightly corroded partially on the inner side of the negative electrode can, no thickness change detected |
| Example 4: | Slightly corroded partially on the inner side of the negative electrode can, no thickness change detected |
| Comparative Example 1: | No change |
| Comparative Example 2: | No change |
| Comparative Example 3: | Slightly corroded partially on the inner side of the negative electrode can, no thickness detected |
| Comparative Example 4: | Slightly corroded partially on the inner side of the negative electrode can, thickness reduced by 60 to 100% |

(d) Rigidity Test:

The foregoing batteries were cut and examined for deformation of the sealing plate. The results are set forth in Table 4. The battery of Comparative Example 2 was confirmed to have been somewhat deformed on the sealing plate at the safety valve under pressure.

TABLE 4

| Example No. | Conditions Inside Battery |
| --- | --- |
| Example 1: | No change |
| Exampld 2: | No change |
| Example 3: | No change |
| Example 4: | No chanae |
| Comparative Example 1: | No change |
| Comparative Example 2: | Sealing plate deformed 0.15 mm inwardly |
| Comparative Example 3: | No change |
| Comparative Example 4: | No change |

(e) Workability Test:

The number of defective samples out of 30,000 sheets of the sealing plates used in the foregoing tests was examined. The results are set forth in Table 5. Comparative Example 1 showed about 10 times more defective samples than the other examples.

TABLE 5

| Example No. | Number of Defective Samples |
| --- | --- |
| Example 1: | 3 |
| Example 2: | 3 |
| Example 3: | 3 |
| Example 4: | 3 |
| Comparative Example 1: | 29 |
| Comparative Example 2: | 3 |
| Comparative Example 3: | 2 |
| Comparative Example 4: | 1 |

These results show that the battery according to the present invention as shown in these examples exhibits a higher corrosion resistance, rigidity and workability than the prior art batteries as shown in the comparative examples.

Thus, the present invention provides a nonaqueous battery having a high corrosion resistance, rigidity and workability as shown in these examples.

While the invention has been described in detail and with reference to specific embodiments thereof, it will be apparent to one skilled in the art that various changes and modifications can be made therein without departing from the spirit and scope thereof.

What is claimed is:

1. A secondary battery comprising battery components and a container for housing said battery components, said battery components including a positive electrode made of an active material consisting of lithium Co oxide, a negative electrode made of an active material capable of intercalating/deintercalating lithium ion, and a nonaqueous electrolyte, wherein at least a portion of the container of the battery is made of an austenite stainless steel containing molybdenum and the battery has a maximum charging voltage of 3 to 5 volts.

2. The secondary battery according to claims 1, wherein said austenite stainless steel has a molybdenum content of 1.7 to 4% by weight.

3. The secondary battery according to claims 1, wherein said austenite stainless steel has a molybdenum content of 1.7 to 4% by weight, a nickel content of 10 to 15% by weight and a chromium content of 16 to 19% by weight.

4. The secondary battery according to claim 1, wherein said container comprises a portion made of an austenite stainless steel containing molybdenum which is electrically connected to the positive electrode.

5. The secondary battery according to claim 1, wherein said container comprises a first portion made of an austenite stainless steel containing molybdenum which is electrically connected to the positive electrode and a second portion made of an austenite stainless steel containing molybdenum which is electrically connected to the negative electrode, and said first and second portions of the container are electrically insulated from one another.

6. The secondary battery according to claim 1, wherein the negative electrode active material is a Li-containing oxide.

7. The secondary battery according to claim 6, wherein the Li-containing oxide is $Li_e M_f O_g$ where M represents at least one metal selected from the group consisting of V, Mn, Fe, Co and Ni, e is from 0.7 to 3, f represents an integer of 1 or 2, and g is from 1 to 5.5.

8. The secondary battery according to claim 7, wherein the Li-containing oxide is $Li_p Co_q V_{1-q} O_r$ where p is from 0.7 to 3, q is from 0 to 1, and g is from 1.2 to 5.5.

* * * * *